US 6,726,166 B2

(12) United States Patent
Goodman

(10) Patent No.: US 6,726,166 B2
(45) Date of Patent: Apr. 27, 2004

(54) CABLE CLAMP

(75) Inventor: William Max Goodman, Richmond, TX (US)

(73) Assignee: All-Points Equipment Co., L.P., Richmond, TX (US)

( * ) Notice: Subject to any disclaimer, the term of this patent is extended or adjusted under 35 U.S.C. 154(b) by 0 days.

(21) Appl. No.: 10/073,551

(22) Filed: Feb. 11, 2002

(65) Prior Publication Data

US 2002/0070317 A1 Jun. 13, 2002

Related U.S. Application Data

(63) Continuation-in-part of application No. 09/523,765, filed on Mar. 11, 2000, now Pat. No. 6,431,502.

(51) Int. Cl.⁷ .............................................. A47B 96/06
(52) U.S. Cl. ..................... 248/229.14; 248/58; 248/61; 248/74.1; 248/65
(58) Field of Search ............................. 248/229.14, 58, 248/61, 62, 74.1, 65; 403/309, 310, 351, 276

(56) References Cited

U.S. PATENT DOCUMENTS

| 330,703 A | 11/1885 | Hoey |
| 1,604,590 A | 10/1926 | McNulty |
| 1,834,838 A | * 12/1931 | Hingley |
| 2,444,781 A | 7/1948 | Ingham |
| 2,727,272 A | 12/1955 | Hankin et al. |
| 3,856,244 A | 12/1974 | Menshen |
| 3,866,871 A | 2/1975 | Dupuy, Sr. |
| 4,059,872 A | 11/1977 | Delesandri |
| 4,143,844 A | 3/1979 | Van Meter |
| 4,405,274 A | * 9/1983 | Saitoh et al. ................ 411/249 |
| 4,437,791 A | 3/1984 | Reynolds |
| 4,566,819 A | 1/1986 | Johnston |
| 4,597,690 A | 7/1986 | Girard |
| 4,915,305 A | * 4/1990 | O'Brien et al. .............. 239/550 |
| 4,976,577 A | * 12/1990 | Brown et al. ................ 411/271 |
| 5,129,608 A | * 7/1992 | Goldman .................... 248/74.3 |
| 5,281,042 A | * 1/1994 | Belrose ...................... 403/234 |
| 5,435,506 A | 7/1995 | Wiley |
| 5,542,776 A | * 8/1996 | Reynolds .................... 403/389 |
| 5,904,445 A | 5/1999 | Meuth |
| 5,921,517 A | 7/1999 | Meuth |
| 6,173,926 B1 | 1/2001 | Elvegaard |

* cited by examiner

Primary Examiner—Korie Chan
Assistant Examiner—Steven Marsh
(74) Attorney, Agent, or Firm—John R Casperson

(57) ABSTRACT

A clamp assembly is provided for clamping one tubular to another, such as a control line to a marine choke and kill riser line. The clamp assembly comprises an upper clamp half, a lower clamp half, a hinge pin connecting the halves, and a fastener latching the halves. The fastener comprises a bolt carried by a rotatable pivot pin mounted in the lower clamp half. Slots are provided in the upper clamp half and the lower clamp half so that the bolt can swing in and out of engagement with the clamp halves to permit the assembly to be opened for mounting the tubular, and then closed and locked by tightening the bolt to retain the tubular in the clamp assembly. Loose parts are thereby avoided.

16 Claims, 4 Drawing Sheets

CABLE CLAMP

CROSS REFERENCES TO RELATED APPLICATIONS

This application is a continuation-in-part of my earlier application Ser. No. 09/523,765 filed Mar. 11, 2000, now U.S. Pat. No. 6,431,502 issued Aug. 13, 2002, the disclosure of which is incorporated herein by reference.

BACKGROUND OF THE INVENTION

1. Field of the Invention

The present invention relates generally to clamp assemblies for connecting one member to a support member. In a particularly preferred aspect, the invention relates to an ultra high strength clamp assembly to attach a pipe or line, such as an umbilical line, to another pipe. In a specific embodiment, the invention is particularly adapted for use as a subsea clamp assembly to attach an umbilical line to a choke or kill line of a subsea riser. In the specific embodiment the invention is particularly adapted for use as a variable height stand-off assembly to attach an umbilical line to a choke or kill line in a marine riser assembly.

2. Background of the Invention

The need often arises for a clamp assembly to attach a cable, hose or pipe to a support member or pipe. The situation often occurs where an umbilical line is required to be secured to a support member or pipe at a certain distance away from the support member, for example, to accommodate insulation, floatation and mechanical barriers.

In the offshore drilling and production industry, it is frequently necessary to run umbilical lines hundreds and even thousands of feet below the support vessel or drilling or production platform down to the sea floor and beyond. Typically, the umbilical lines, which may include electric, MUX (fiber optics), and hydraulics, are required to be attached to a support member, such as a choke or kill line, or mud line on a subsea riser system. Due to the high cost of working in such environments, it is critical that the clamp assembly be reliable and dependable to firmly secure the clamped members to prevent costly consequences, such as loss of signal in a fiber optic cable due to slack in an umbilical line which can create a sharp radius in the line preventing signal transmission. Various types of clamp assemblies and stand-off assemblies have been used in these situations. The prior art clamp assemblies and stand-off assemblies have been very costly and time consuming to make, use and install, and many do not clamp the umbilical lines with enough force.

In my earlier patent application, Ser. No. 09/523,765, a clamp assembly was proposed which overcomes many of the above noted deficiencies. This invention makes improvements to the design shown in my earlier application to provide even greater reliability and ease of use in the field.

SUMMARY OF THE INVENTION

The invention provides an improvement to the clamp assembly shown in my earlier copending application. This clamp assembly comprises an upper clamp half, a lower clamp half, a hinge pin connecting the halves, and a fastener latching the halves. The upper clamp half has a downwardly facing parting line face. The lower clamp half has an upwardly facing parting line face and is positioned in a face to face relationship with the upper clamp half so that the parting line faces are side by side. The hinge pin pivotally connects the clamp halves along a hinge edge. A fastener connects the clamp halves along a latch edge. The clamp halves, when positioned the clamp closed position, define at least one passage therethrough for clamping a cylindrical object, wherein the passage has a longitudinal axis. The improved fastener mechanism comprises providing an upper flange element which protrudes from the latch edge of the upper clamp half in a direction, when in the clamp closed position, generally laterally from the longitudinal axis of the passage, and a lower flange element protruding from the latch edge of the lower clamp half in a direction generally laterally from the longitudinal axis of the passage. The lower flange element is in side-by-side relationship with the upper flange element when the clamp assembly is in the closed position, and further defines a passage for receipt of a carrier pin. A carrier pin is rotatably positioned in the carrier pin passage. The carrier pin has a longitudinal axis and defines a transverse borehole for receipt of a locking bolt. A locking bolt having a shaft end is positioned in the transverse borehole and extends radially from the carrier pin. The locking bolt has a head end which is spaced apart from the carrier pin. The upper flange element and the lower flange element define a pair of aligned slots when the clamp assembly is in the closed position to permit the locking bolt to be pivotally moved from a disengaged position wherein the head of the locking bolt laterally displaced from the lower flange element to a lockable position wherein the shaft of the locking bolt is positioned in the aligned slots. The head of the locking bolt is sized to contact the upper flange element when the locking bolt is in the lockable position so that threading the locking bolt toward the carrier pin urges the upper flange element toward the lower flange element to lock the clamp assembly in the closed position.

The invention provides a locking mechanism which has greater reliability than the earlier embodiment and has no loose parts.

DETAILED DESCRIPTION OF THE INVENTION

Figure 1:
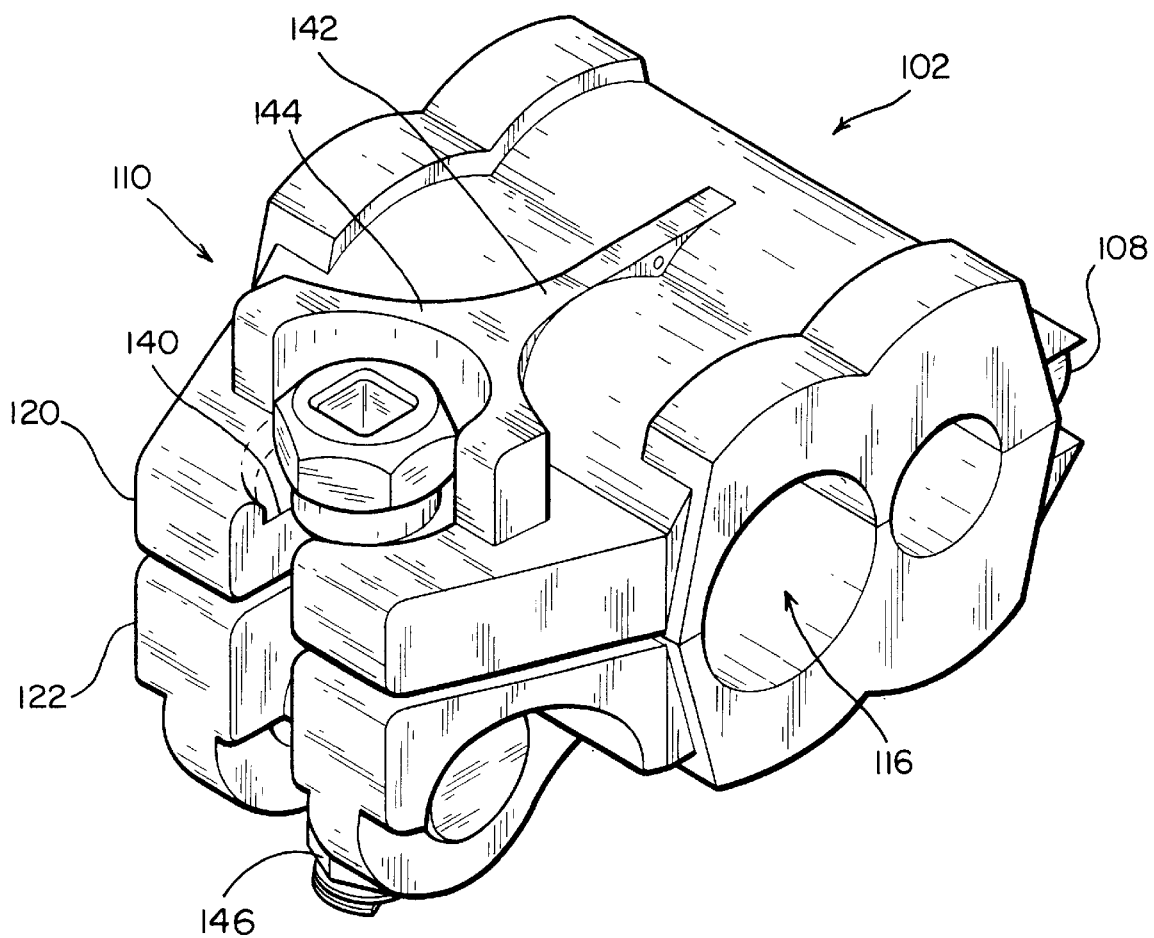
FIG. 1 is a pictorial representation of one embodiment of the invention.
Figure 2:
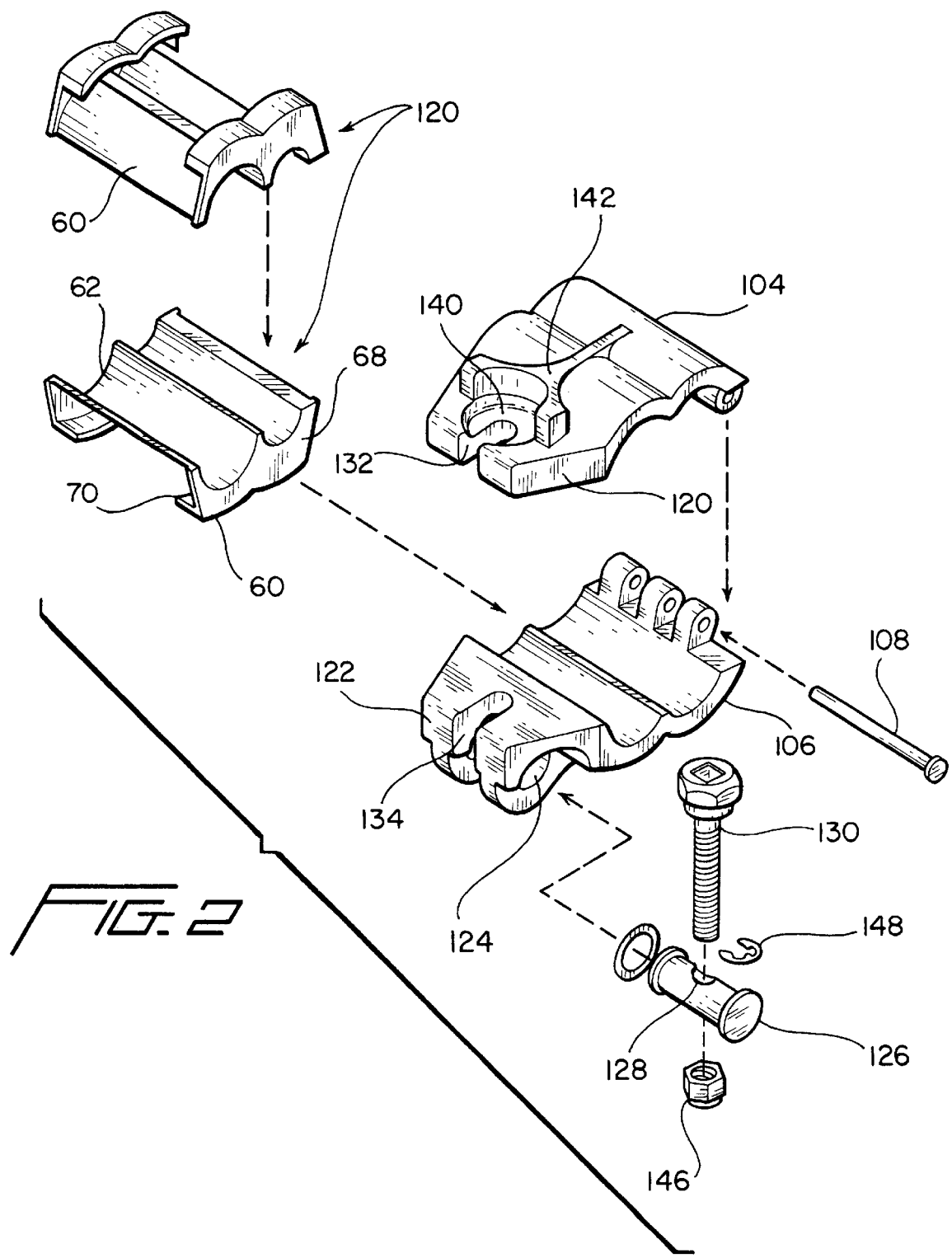
FIG. 2 is an exploded view of the invention shown in FIG. 1.

The clamp assembly 102 comprises an upper clamp half 104, a lower clamp half, 106, a hinge pin 108 connecting the halves, and a fastener mechanism 110 for latching the halves. The upper clamp half has a downwardly facing parting line face. The lower clamp half has an upwardly facing parting line face and is positioned in a face to face relationship with the upper clamp half so that the parting line faces are side by side. The hinge pin pivotally connects the clamp halves along a hinge edge. The fastener mechanism connects the clamp halves along a latch edge.

The clamp halves, when positioned in a face to face relationship, form a clamp assembly which defines at least one passage 116 therethrough for clamping a cylindrical object, such as a subsea well control line not shown. The passage has a longitudinal axis and the clamp assembly parts along a parting plane which encompasses the longitudinal axis.

In a preferred embodiment, the clamp assembly defines a pair of passages extending therethrough in side-by-side relationship. Even more preferred, an elastomeric liner 120 lines each of the passages which extend though the clamp assembly.

Preferably, each elastomeric liner comprises a pair of liner halves 60 positioned in face to face relationship. Each liner half defines at least one trough 62. One liner half is positioned in each clamp half. Each passage through the clamp assembly is defined by a pair of facing troughs from facing liner halves. In a preferred embodiment, each trough is semicylindrically shaped. A layer of an anti-skid material is preferably positioned in each of the semi-cylindrical troughs. Most preferably, the layer of anti-skid material comprises a screen which is coated with abrasive particles.

In order that the liner resist dislodging during handling and use, it is preferably provided with a flange 68 on each end. Each of the flanges preferably has a lip 70 which extends toward the opposite flange and retains the liner half in position on the clamp half.

The lips on the liner end flanges combined with its elastomeric construction permit the liner to be snapped onto a clamp half to facilitate handling and reduce the likelihood of accidental dislodging. The anti-skid material can be positioned with a layer of adhesive material positioned between the elastomeric liner half and the layer of anti-skid material, preferably a waterproof adhesive. Suitable anti-skid material is commercially available as sanding screen and can be purchased in rolls. A coarse plastic pipe sanding screen has been used with good results. Such screen is waterproof, washable, has an open mesh backing, and is coated with abrasive on both sides. The coated abrasive comprises sharp silicon carbide particles.

The elastomer generally has a durometer of between about 70 and 130, preferably a durometer of between about 85 and about 105. Nitrile rubber having a durometer of about 95 has been used with good results. In the illustrated embodiment, the outside wall of the liner half defines half of a side-by-side tubular surface. The inside wall of the liner half defines flats for abutting corresponding flats on an inside wall of an opposed liner half. The inside radii of the liner halves can be sized as desired to accommodate different sized lines to be clamped.

Figure 3:
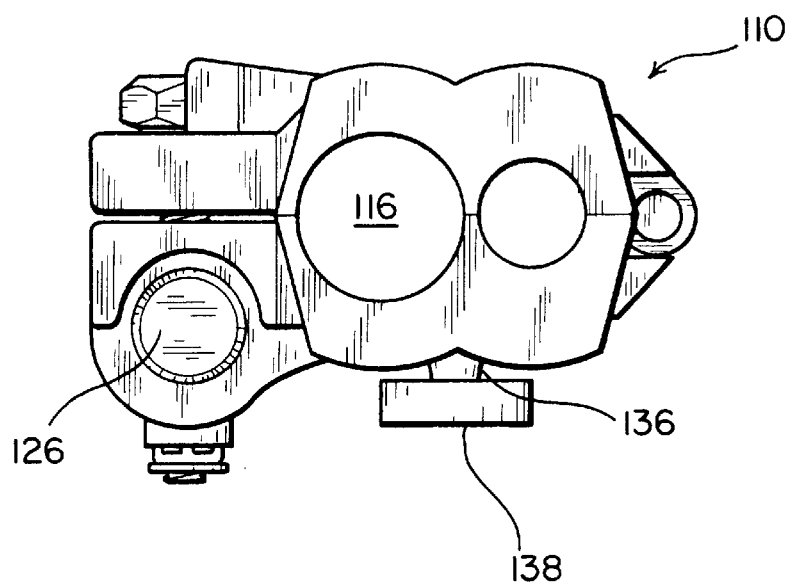
FIG. 3 is an end view of the invention as shown in FIG. 1 illustrating a locked position.
Figure 4:
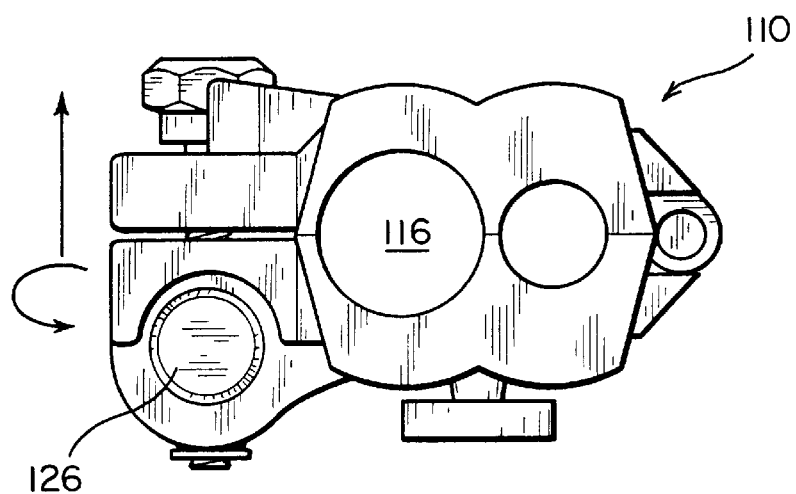
FIG. 4 is an end view as in FIG. 3 illustrating the beginning step of an unlocking procedure.
Figure 5:
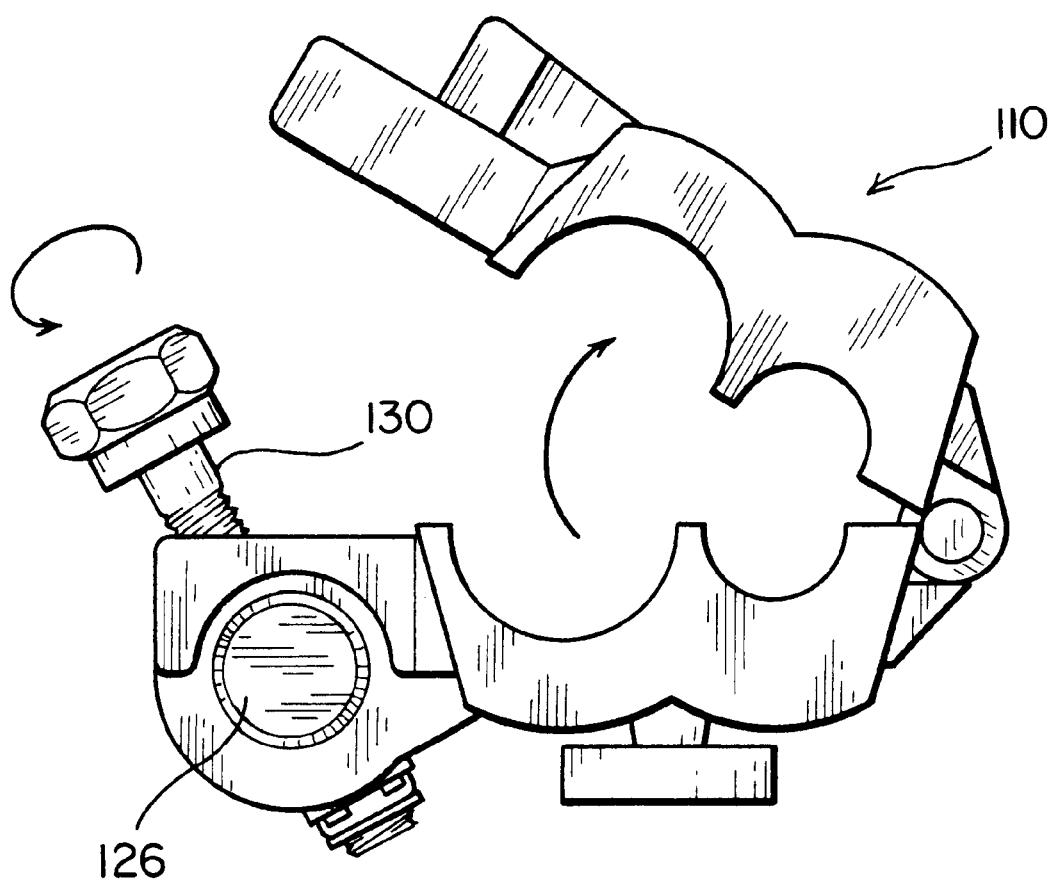
FIG. 5 is an end view as in FIG. 4 illustrating an unlocked position.

The improved fastener mechanism comprises providing an upper flange element 120 which protrudes from the latch edge of the upper clamp half in a direction, when in the clamp closed position, generally laterally from the longitudinal axis of the passage, and a lower flange element 122 protruding from the latch edge of the lower clamp half in a direction generally laterally from the longitudinal axis of the passage. The lower flange element is in side-by-side relationship with the upper flange element when the clamp assembly is in the closed position, and further defines a passage 124 for receipt of a carrier pin. A carrier pin 126 is rotatably positioned in the carrier pin passage. The carrier pin has a longitudinal axis and defines a transverse borehole 128 for receipt of a locking bolt. A locking bolt 130 having a shaft end is positioned in the transverse borehole and extends radially from the carrier pin. The locking bolt has a head end which is spaced apart from the carrier pin. The upper flange element and the lower flange element define a pair of aligned slots 132,134 when the clamp assembly is in the closed position to permit the locking bolt to be pivotally moved from a disengaged position (see FIG. 5) wherein the head of the locking bolt is laterally displaced from the lower flange element to a lockable position (see FIG. 4) wherein the shaft of the locking bolt is positioned in the aligned slots. The head of the locking bolt is sized to contact the upper flange element when the locking bolt is in the lockable position so that threading the locking bolt toward the carrier pin urges the upper flange element toward the lower flange element to lock the clamp assembly in the closed position (see FIG. 3).

In a preferred embodiment, a support leg 136 extends from the lower clamp half, preferably in a plane which is normal to the longitudinal axis of the passage through the assembly for clamping a cylindrical object. The support leg has an upper end attached to the lower clamp half and a lower end. A shoe 138 is positioned on the lower end of the support leg. The shoe is received by structure not shown which is clamped to the marine riser or other structure to which the control line is to be mounted.

The carrier pin passage is preferably parallel the longitudinal axis of the passage for clamping a cylindrical object and the bolt swings in a pivot plane which is normal to the passage for clamping a cylindrical object. The hinge pin preferably has a longitudinal axis which is positioned parallel to the longitudinal axis of the passage for clamping a cylindrical object and the clamp halves swing open in a pivot plane which is normal to the passage for clamping a cylindrical object.

The upper flange element preferably has an upwardly facing surface which defines a depression 140 sized to accept and partially protect the head of the locking bolt when the locking bolt is in the lockable position. More preferably, the upper flange element has an upwardly facing surface which defines a rib 142 extending from near the slot toward the hinge pin to partially protect the head of the locking bolt when the locking bolt is in the lockable position. Most preferably, the upper flange element has an upwardly facing surface which defines a forked ridge 144 which partially bounds both sides of the depression and extends toward the hinge pin to partially protect the head of the locking bolt when the locking bolt is in the lockable position.

In the illustrated embodiment a nut 146 is positioned in the slot of the lower flange element and is threadably connected to the locking bolt. A snap ring 148 is positioned on an end of the bolt to interfere with removal of the nut and eliminate loose parts which could be dropped in the field.

While certain preferred embodiments of the invention have been described herein, the invention is not to be construed as being so limited, except to the extent that such limitations are found in the claims.

What is claimed is:

1. In a clamp assembly for a tubular hose or cable, said clamp assembly comprising
   an upper clamp half having a downwardly facing parting line face;
   a lower clamp half having an upwardly facing parting line face, said lower clamp half being positioned in a face to face relationship with the upper clamp half so that the parting line faces are side by side when the clamp assembly is in the closed position;
   a hinge pin pivotally connecting the clamp halves along a hinge edge, so that said clamp halves are movable from a clamp open position to a clamp closed position,
   a fastener mechanism for connecting the clamp halves along a latch edge when the clamp is in the clamp closed position;
   wherein the clamp halves, when positioned in the clamp closed position, define at least one passage therethrough for clamping a cylindrical object, wherein said passage has a longitudinal axis, the improvement of a fastener mechanism comprising an upper flange element protruding from the latch edge of the upper clamp half in a direction, when in the clamp closed position, generally laterally from the longitudinal axis of said passage, a lower flange element protruding from the latch edge of the lower clamp half in a direction generally laterally from the longitudinal axis of said passage, said lower flange element being in side-by-side relationship with the upper flange element when the clamp assembly is in the closed position, said lower flange element defining a passage for receipt of a carrier pin, a carrier pin rotatably positioned in the carrier pin passage, said carrier pin having a longitudinal axis and defining a transverse borehole for receipt of a locking bolt, and a locking bolt having a shaft portion positioned in the transverse borehole and extending radially therefrom, said locking bolt having a head portion spaced apart from the carrier pin, wherein the upper flange element and the lower flange element define a pair of aligned slots when the clamp assembly is in the closed position to permit the locking bolt to be pivotally moved from a disengaged position wherein the head of the locking bolt is laterally displaced from the lower flange element to a lockable position wherein the shaft of the locking bolt is positioned in the aligned slots, and wherein the head portion of the locking bolt is sized to contact the upper flange element when the locking bolt is in the lockable position so that threading the shaft portion of the locking bolt toward the carrier pin urges the upper flange element toward the lower flange element to lock the clamp assembly in the closed position.

2. A clamp assembly as in claim 1 wherein the clamp assembly defines a pair of passages extending therethrough in side-by-side relationship.

3. A clamp assembly as in claim 2 further comprising an elastomeric liner which lines each of the passages which extend through the clamp assembly for clamping the cylindrical object.

4. A clamp assembly as in claim 3 wherein the elastomeric liner comprises a pair of liner halves positioned in face to face relationship, each liner half defining at least one trough, one liner half in each clamp half, and each passage through the clamp assembly is defined by a pair of facing troughs from facing liner halves.

5. A clamp assembly as in claim 4 wherein each trough is semicylindrical.

6. A clamp assembly as in claim 5 wherein each of the liner halves has a flange on each end.

7. A clamp assembly as in claim 6 wherein each of the flanges has a lip which extends toward the opposite flange and retains the liner half in position on the clamp half.

8. A clamp assembly as in claim 7 further comprising a support leg extending from the lower clamp half, said support leg having an upper end attached to the lower clamp half and a lower end; and a shoe positioned on the lower end of the support leg.

9. A clamp assembly as in claim 8 wherein the support leg is positioned in a plane which is normal to the longitudinal passage through the clamp assembly for clamping the cylindrical object.

10. A clamp assembly as in claim 1 wherein the carrier pin passage is parallel to the longitudinal axis of the passage for clamping the cylindrical object and the bolt swings in a pivot plane which is normal to the passage for clamping the cylindrical object.

11. A clamp assembly as in claim 10 wherein the hinge pin has a longitudinal axis which is positioned parallel to the longitudinal axis of the passage for clamping the cylindrical object and the clamp halves swing open in a pivot plane which is normal to the passage for clamping the cylindrical object.

12. In a clamp assembly for a tubular hose or cable, said clamp assembly comprising an upper clamp half having a downwardly facing parting line face;

a lower clamp half having an upwardly facing parting line face, said lower clamp half being positioned in a face to face relationship with the upper clamp half so that the parting line faces are side by side when the clamp assembly is in the closed position;

a hinge pin pivotally connecting the clamp halves along a hinge edge, so that said clamp halves are movable from a clamp open position to a clamp closed position, a fastener mechanism for connecting the clamp halves along a latch edge when the clamp is in the clamp closed position;

wherein the clamp halves, when positioned in the clamp closed position, define at least one passage therethrough for clamping a cylindrical object, wherein said passage has a longitudinal axis, the improvement of a fastener mechanism comprising an upper flange element protruding from the latch edge of the upper clamp half in a direction, when in the clamp closed position, generally laterally from the longitudinal axis of said passage, a lower flange element protruding from the latch edge of the lower clamp half in a direction generally laterally from the longitudinal axis of said passage, said lower flange element being in side-by-side relationship with the upper flange element when the clamp assembly is in the closed position, said lower flange element defining a passage for receipt of a carrier pin, a carrier pin rotatably positioned in the carrier pin passage, said carrier pin having a longitudinal axis and defining a transverse borehole for receipt of a locking bolt, and a locking bolt having a shaft portion positioned in the transverse borehole and extending radially therefrom, said locking bolt having a head portion spaced apart from the carrier pin, wherein the upper flange element and the lower flange element define a pair of aligned slots when the clamp assembly is in the closed position to permit the locking bolt to be pivotally moved from a disengaged position wherein the head of the locking bolt is laterally displaced from the lower flange element to a lockable position wherein the shaft of the locking bolt is positioned in the aligned slots, wherein the head portion of the locking bolt is sized to contact the upper flange element when the locking bolt is in the lockable position so that threading the shaft portion of the locking bolt toward the carrier pin urges the upper flange element toward the lower flange element to lock the clamp assembly in the closed position, and wherein the upper flange element has an upwardly facing surface which defines a depression sized to accept and partially protect the head of the locking bolt when the locking bolt is in the lockable position.

13. In a clamp assembly for a tubular hose or cable, said clamp assembly comprising an upper clamp half having a downwardly facing parting line face;

a lower clamp half having an upwardly facing parting line face, said lower clamp half being positioned in a face to face relationship with the upper clamp half so that the parting line faces are side by side when the clamp assembly is in the closed position;

a hinge pin pivotally connecting the clamp halves along a hinge edge, so that said clamp halves are movable from a clamp open position to a clamp closed position, a fastener mechanism for connecting the clamp halves along a latch edge when the clamp is in the clamp closed position;

wherein the clamp halves, when positioned in the clamp closed position, define at least one passage therethrough for clamping a cylindrical object, wherein said passage has a longitudinal axis, the improvement of a fastener mechanism comprising an upper flange element protruding from the latch edge of the upper clamp half in a direction, when in the clamp closed position, generally laterally from the longitudinal axis of said passage, a lower flange element protruding from the latch edge of the lower clamp half in a direction generally laterally from the longitudinal axis of said passage, said lower flange element being in side-by-side relationship with the upper flange element when the clamp assembly is in the closed position, said lower flange element defining a passage for receipt of a carrier pin, a carrier pin rotatably positioned in the carrier pin passage, said carrier pin having a longitudinal axis and defining a transverse borehole for receipt of a locking bolt, and a locking bolt having a shaft portion positioned in the transverse borehole and extending radially therefrom, said locking bolt having a head portion spaced apart from the carrier pin, wherein the upper flange element and the lower flange element define a pair of aligned slots when the clamp assembly is in the closed position to permit the locking bolt to be pivotally moved from a disengaged position wherein the head of the locking bolt is laterally displaced from the lower flange element to a lockable position wherein the shaft of the locking bolt is positioned in the aligned slots, wherein the head portion of the locking bolt is sized to contact the upper flange element when the locking bolt is in the lockable position so that threading the shaft portion of the locking bolt toward the carrier pin urges the upper flange element toward the lower flange element to lock the clamp assembly in the closed position, and wherein the upper flange element has an upwardly facing surface which defines a rib extending from near the slot toward the hinge pin to partially protect the head of the locking bolt when the locking bolt is in the lockable position.

14. A clamp assembly as in claim 12 wherein the upper flange element has an upwardly facing surface which defines a forked ridge which partially bounds both sides of the depression and extends toward the hinge pin to partially protect the head of the locking bolt when the locking bolt is in the lockable position.

15. A clamp assembly as in claim 12 further comprising a nut positioned in the slot of the lower flange element threadably connected to the locking bolt.

16. A clamp assembly as in claim 15 further comprising a snap ring positioned on an end of the bolt to interfere with removal of the nut.

* * * * *